Patented Nov. 1, 1938

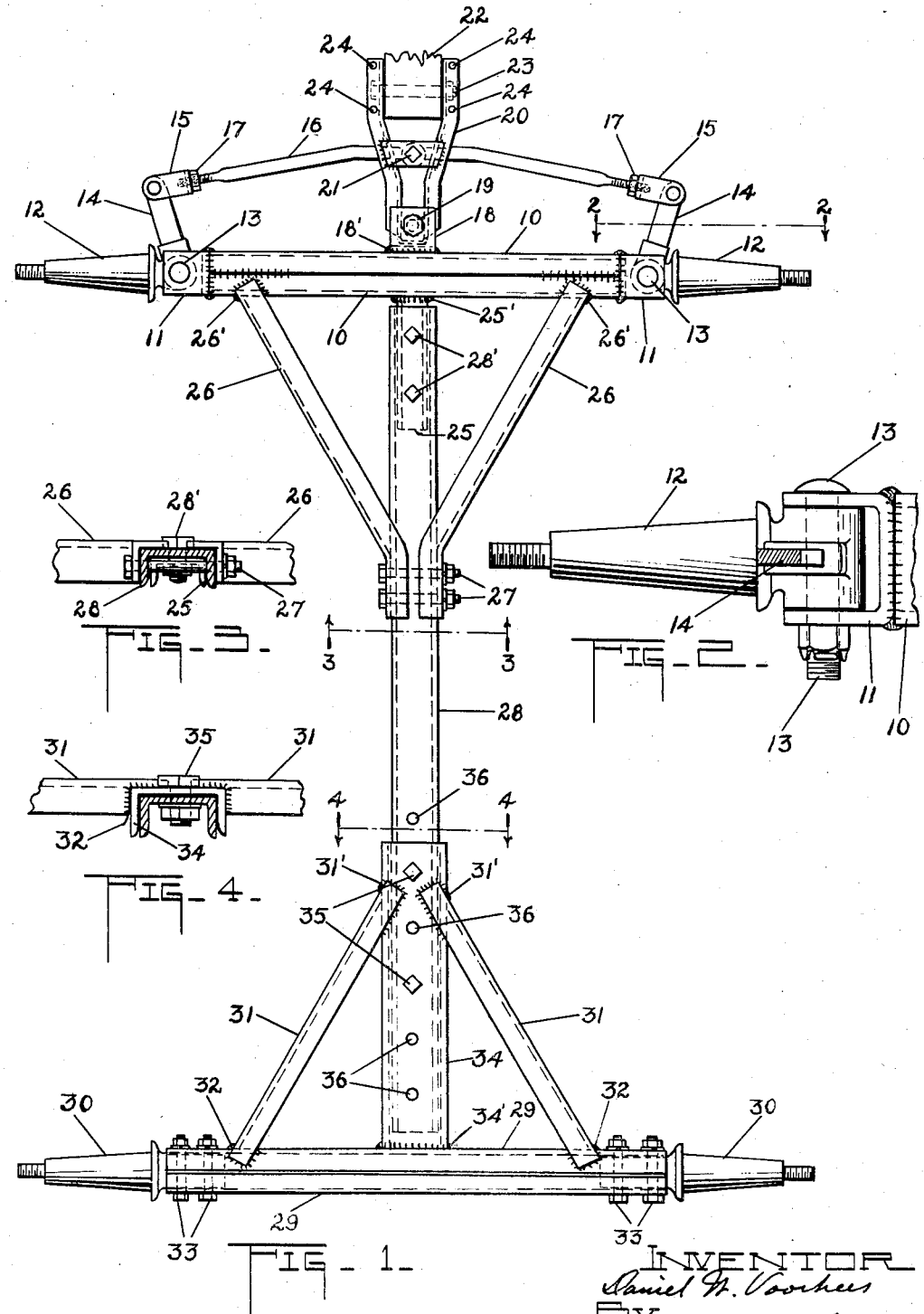

2,135,227

UNITED STATES PATENT OFFICE 2,135,227

STEEL FARM TRUCK CHANNEL IRON REACH

Daniel W. Voorhees, Peru, Ill.

Application August 29, 1936, Serial No. 98,555

1 Claim. (Cl. 280—142)

This invention relates to the design of a steel farm truck or wagon, and is one of a series of inventions by the same inventor on the same general subject.

The growing importance of the automobile truck, enhanced by good roads, for the hauling of farm products, has decreased the need for high wheeled farm wagons of wood construction which are relatively high priced, and has created a demand for the cheaper light strong wagons of steel construction for general utility hauling about the farm.

The adaptation of steel to the construction of wagons has required a very considerable change in structure and design, and it is to the design of such steel wagons that this invention is directed.

The principal object of the invention is to provide a strong, light, durable wagon of steel construction.

Another object is to provide a steel wagon of the auto steer type as better adapted for the utility of the wagon and for steel construction.

A still further object is to provide adjustable reach members of steel channel section in a design permitting easy and effective welding for fabrication.

Another object is to provide a general design and structure that will permit the assembly of the wagon from shipping bundles of convenient size with ordinary tools.

Other objects and benefits will be disclosed from the following description and illustrations of which:

Fig. 1 is a general plan view of my wagon, showing the axle hounds and reach members in their proper relation to each other; and, Fig. 2 is a side elevation of the pivotal axle on a larger scale showing details of the pivotal axle and pintle mounting; and, Fig. 3 is a cross section of the reach on the section lines 3—3 looking forward; and, Fig. 4 is a cross sectional view of the reach on the section lines 4—4 looking rearward.

My steel farm truck is a novel combination of elements in which the numeral 10 indicates front steel axle members welded together and joined by welding to the axle forks 11. The axle spindle 12 shows a standard tapered axle design and is pivotally mounted in the axle forks 11 by the bolts 13. The pivotal action of the axle is through the radius arms 14 attached to the axles 12 and the clevis members 15 pivotally mounted on the ends of the radius arms 14. The radius rod 16 is threaded in the ends of the clevis members 15, in order to provide proper adjustment of the pivotal axles, and when so properly adjusted are locked by the nuts 17. A pole clevis member 18 is welded to the front center of the axle 10 by the weld 18'. The pole hound 20 is also pivotally connected to the radius rod 16 by the bolt 21. The pole 22 is pivotally mounted in the hound 20 by the bolt 23, however, provision is made for mounting the pole stiff in the hound by cross straps bolted through the holes 24.

A channel iron reach post 25 is welded in the rear center of the axle 10 by the weld 25'. Forward hound members 26 are angle irons welded directly to the axle member 10 at 26'. It will be noted that the horizontal leg of the angle overlaps the top of the axle and the vertical member of the leg extends downward on the vertical face of the axle. The hound members 26 are formed on their rear ends to fit the reach and are attachable thereto by the bolts 27.

The reach member 28 is a channel iron with the legs extending downward as do all channel members in my reach construction. The purpose of this is to prevent snow, ice, and other foreign substances gathering in the channels which would interfere with the adjustment of the reach when that is necessary. It also provides a structurally strong and convenient assembly of the reach members because the various channel members fit together and may be firmly bolted through the horizontal webs which are in direct contact with each other.

The rear axle is made of channel members 29 surrounding axle spindle members 30 with all members bolted firmly together by bolts 33. Rear hound members 31 are angle irons, the upper surfaces being horizontal and overlapping the axle members 29 and the other leg of the angle being vertical and contacting the vertical face of the axle. These are welded directly to the axle by the weld 32. The channel iron reach member 34 is welded to the axle member 29 by the weld 34' and is again welded to the hound members 31 similarly as they are welded to the axle at the weld points 31'. The reach 28 is bolted to the reach member 34 by the bolts 35 through mating holes 36 in both members 28 and 34. These holes provide convenient adjustment of the reach within the adequate limits of the holes 36.

With this explanation of the relation of the parts, I believe that my wagon structure will be completely understood.

I now claim as new:

In a steel farm truck, a steel front axle having pintle forks, axle spindles pivotally mounted in said forks, a pole hound pivotally mounted on said axle, means to pivotally connect the axle spindles with the pole hound, a relatively short channel form reach post secured to and projecting rearwardly from the front axle, structural steel axle hounds welded to the front axle, a steel rear axle with axle spindles bolted thereto, a channel form reach post secured to and projecting forwardly from the rear axle, structural steel rear hounds welded to the rear axle and to the rear axle reach post, a main channel form reach member adapted to telescope with and boltable to the front axle reach post, and adapted to telescope within the rear axle reach post and to be adjustably bolted thereto, said front hounds having rear end portions to fit against opposite sides of the main reach member and to be attached thereto by bolts extending transversely through said main reach member.

DANIEL W. VOORHEES.